United States Patent
Balakrishnan et al.

(10) Patent No.: US 11,030,087 B2
(45) Date of Patent: Jun. 8, 2021

(54) SYSTEMS AND METHODS FOR AUTOMATED INVOCATION OF ACCESSIBILITY VALIDATIONS IN ACCESSIBILITY SCRIPTS

(71) Applicant: JPMORGAN CHASE BANK, N.A., New York, NY (US)

(72) Inventors: Swaroop Kumar Balakrishnan, Bengaluru (IN); Raj Dhilip Kumar Rajmohan, Pondicherry (IN); Reddeppa Mandem, Andhra Pradesh (IN); Anil Kumar Movva, Andhra Pradesh (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/530,166

(22) Filed: Aug. 2, 2019

(65) Prior Publication Data
US 2021/0034507 A1   Feb. 4, 2021

(51) Int. Cl.
*G06F 9/44* (2018.01)
*G06F 11/36* (2006.01)

(52) U.S. Cl.
CPC ...... *G06F 11/3696* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 7,627,813 B2* | 12/2009 | Roser | ............... | G06F 16/9577 717/126 |
| 8,392,890 B2* | 3/2013 | Miller | ............... | G06F 11/3696 717/127 |
| 2012/0246515 A1* | 9/2012 | Lusenhop | ............ | G06F 11/3672 714/32 |
| 2015/0169430 A1* | 6/2015 | Deng | ............... | G06F 11/3676 717/124 |
| 2017/0046251 A1* | 2/2017 | Jafary | ............... | G06F 11/3688 |

* cited by examiner

*Primary Examiner* — Qamrun Nahar
(74) *Attorney, Agent, or Firm* — Greenberg Traurig LLP

(57) ABSTRACT

Systems and methods for automated invocation of accessibility validations in accessibility scripts are disclosed. According to one embodiment, in an information processing apparatus comprising at least one computer processor, an automated accessibility test program performing the following: (1) invoking an automated test program; (2) invoking the automated accessibility test program in the automated test program; (3) loading a webpage to be validated; (4) identifying at least one interactive webpage element on the webpage; (5) causing the automated accessibility program to validate the interactive webpage element with the automated accessibility program; (6) storing a result of the validation; and (7) performing an action validation on the interactive webpage element.

20 Claims, 2 Drawing Sheets

SYSTEMS AND METHODS FOR AUTOMATED INVOCATION OF ACCESSIBILITY VALIDATIONS IN ACCESSIBILITY SCRIPTS

BACKGROUND OF THE INVENTION

1. Field of the Invention

Embodiments are directed to systems and methods for automated invocation of accessibility validations in accessibility scripts.

2. Description of the Related Art

Websites are often tested for accessibility issues during development. For example, websites may be tested to make sure that they comply with interactive accessibility requirements of The Americans with Disabilities Act (ADA) and/or other accessibility standards, such as The Twenty-First Century Communications And Video Accessibility Act. This testing usually involves the use of scripts that invoke accessibility-related validations. A developer must not only decide what accessibility validation to invoke in a script, but also where in the script to invoke that validation.

SUMMARY OF THE INVENTION

Systems and methods for automated invocation of accessibility validations in accessibility scripts are disclosed. According to one embodiment, in an information processing apparatus comprising at least one computer processor, an automated accessibility test program performing the following: (1) invoking an automated test program; (2) invoking the automated accessibility test program in the automated test program; (3) loading a webpage to be validated; (4) identifying at least one interactive webpage element on the webpage; (5) causing the automated accessibility program to validate the interactive webpage element with the automated accessibility program; (6) storing a result of the validation; and (7) performing an action validation on the interactive webpage element.

In one embodiment, the automated accessibility test program may include a binary file that is integrated into the automated test program.

In one embodiment, the automated accessibility test program may be invoked when the webpage is loaded, at an action with the webpage, etc.

In one embodiment, the interactive webpage element may include at least one of a toggle switch, a radio button, a dropdown menu, a checkbox, a data entry field, etc.

In one embodiment, the method may further include storing the interactive webpage elements.

In one embodiment, the step of causing the automated accessibility program to validate the interactive webpage element with the automated accessibility program may include executing a script to validate the interactive webpage element. The script may be specific to a type of interactive webpage element.

In one embodiment, the automated accessibility program may validate the interactive webpage element for code-related violations.

In one embodiment, the action validation may validate that the proper action was taken in response to the actuation of the interactive webpage element.

In one embodiment, the method may further include identifying a second interactive webpage element that is new or has changed; causing the automated accessibility program to validate the second interactive webpage element with the automated accessibility program; storing a result of the validation; and performing an action validation on the second interactive webpage element.

According to another embodiment, a system for automated invocation of accessibility validations in accessibility scripts may included a hosting electronic device comprising at least one computer processor and hosting a webpage under test and a testing electronic device comprising at least one computer processor and executing an automation framework and an accessibility test program. The testing electronic device may invoke an automated test program, and the automation framework may invoke the automated accessibility test program and load the webpage under test. The automation framework or the automated accessibility program may identify at least one interactive webpage element on the webpage under test. The automated accessibility program may validate the interactive webpage element with the automated accessibility program and store a result of the validation. The automation framework may perform action validation on the interactive webpage element.

In one embodiment, the automation framework may reload the webpage under test; the automation framework or the automated accessibility program may identify a second interactive webpage element that is new or has changed; the automated accessibility program may validate the second interactive webpage element; the automated accessibility program may store a result of the validation; and the automation framework may perform action validation on the second interactive webpage element.

In one embodiment, the automated accessibility test program may include a binary file that is integrated into the automation framework.

In one embodiment, the automated accessibility test program may be invoked when the webpage is loaded, at an action with the webpage, etc.

In one embodiment, the interactive webpage element may include a toggle switch, a radio button, a dropdown menu, a checkbox, a data entry field, etc.

In one embodiment, the automation framework or the automated accessibility program may store the interactive webpage elements.

In one embodiment, the automated accessibility program may execute a script to validate the interactive webpage element. In one embodiment, the automated accessibility program may validate the interactive webpage element for code-related violations.

In one embodiment, the action validation may validate that the proper action was taken in response to the actuation of the interactive webpage element.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

The present disclosure generally relates to systems and methods for web page accessibility testing.

Figure 1:
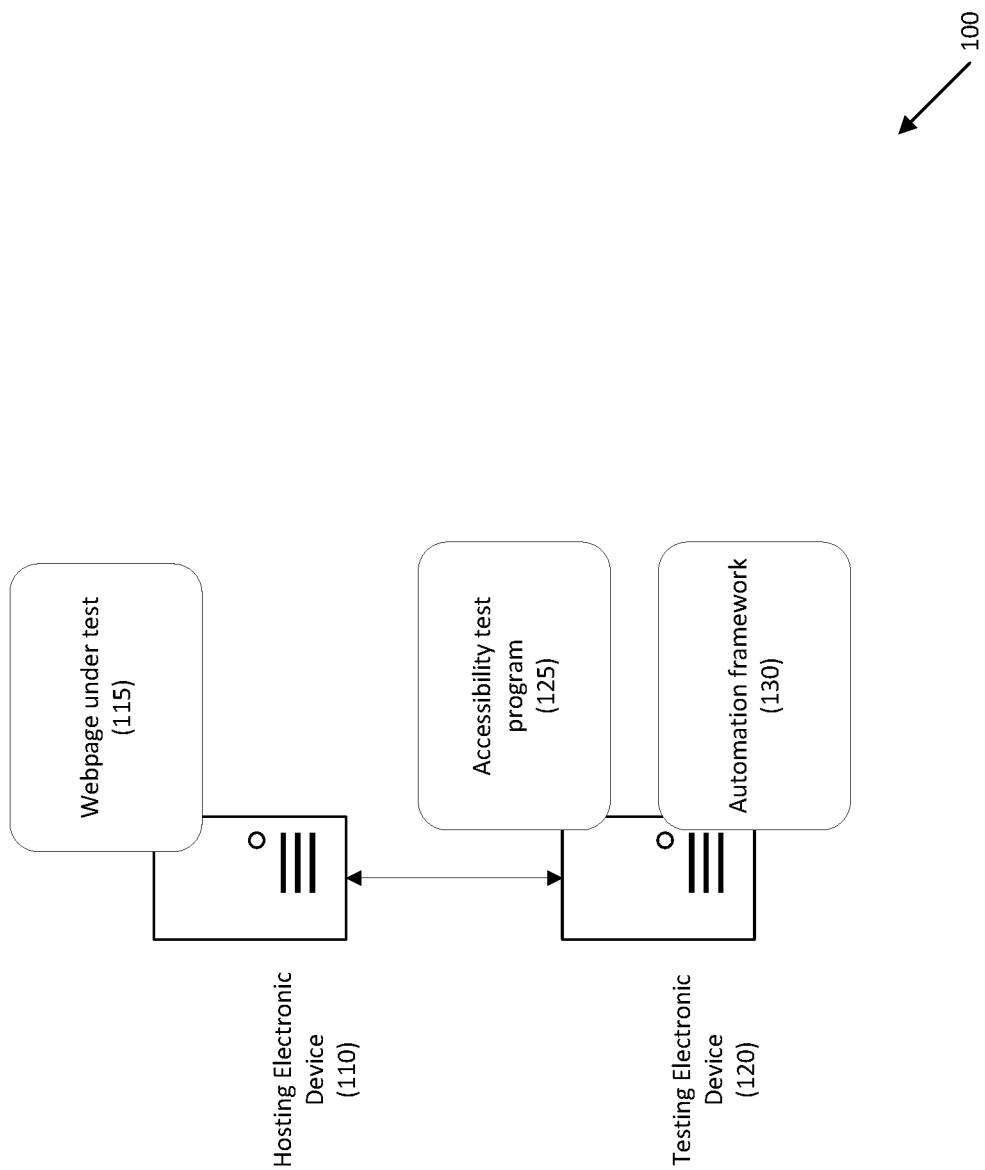
FIG. 1 depicts a system for automated invocation of accessibility validations in accessibility scripts according to one embodiment.

Referring to FIG. 1, a system for automated invocation of accessibility validations in accessibility scripts is disclosed according to one embodiment. System 100 may include hosting electronic device 110 that may host webpage under test 115. In one embodiment, hosting electronic device 110 may be a server, a workstation, a notebook computer, laptop computer, tablet computer, a cloud-based server, etc. In one embodiment, electronic device 110 may host a physical desktop, virtual desktop, etc.

System 100 may further include testing electronic device 120 that may execute accessibility test program 125. In one embodiment, testing electronic device 120 may be a server, a workstation, a notebook computer, laptop computer, tablet computer, a cloud-based server, etc.

In one embodiment, accessibility test program 125 may include one or more accessibility checkpoints, testing scripts, etc. that may be used to test webpage under test 115. In one embodiment, accessibility test program 125 may include additional accessibility checkpoints, testing scripts, etc. that may not be relevant to website under test 115.

In one embodiment, testing electronic device 120 may execute automation framework 130. Accessibility test program 125 may be provided as a binary file, and automation framework 130 may import and activate the binary file activate at strategic points (e.g., page load, actions, etc.).

Figure 2:
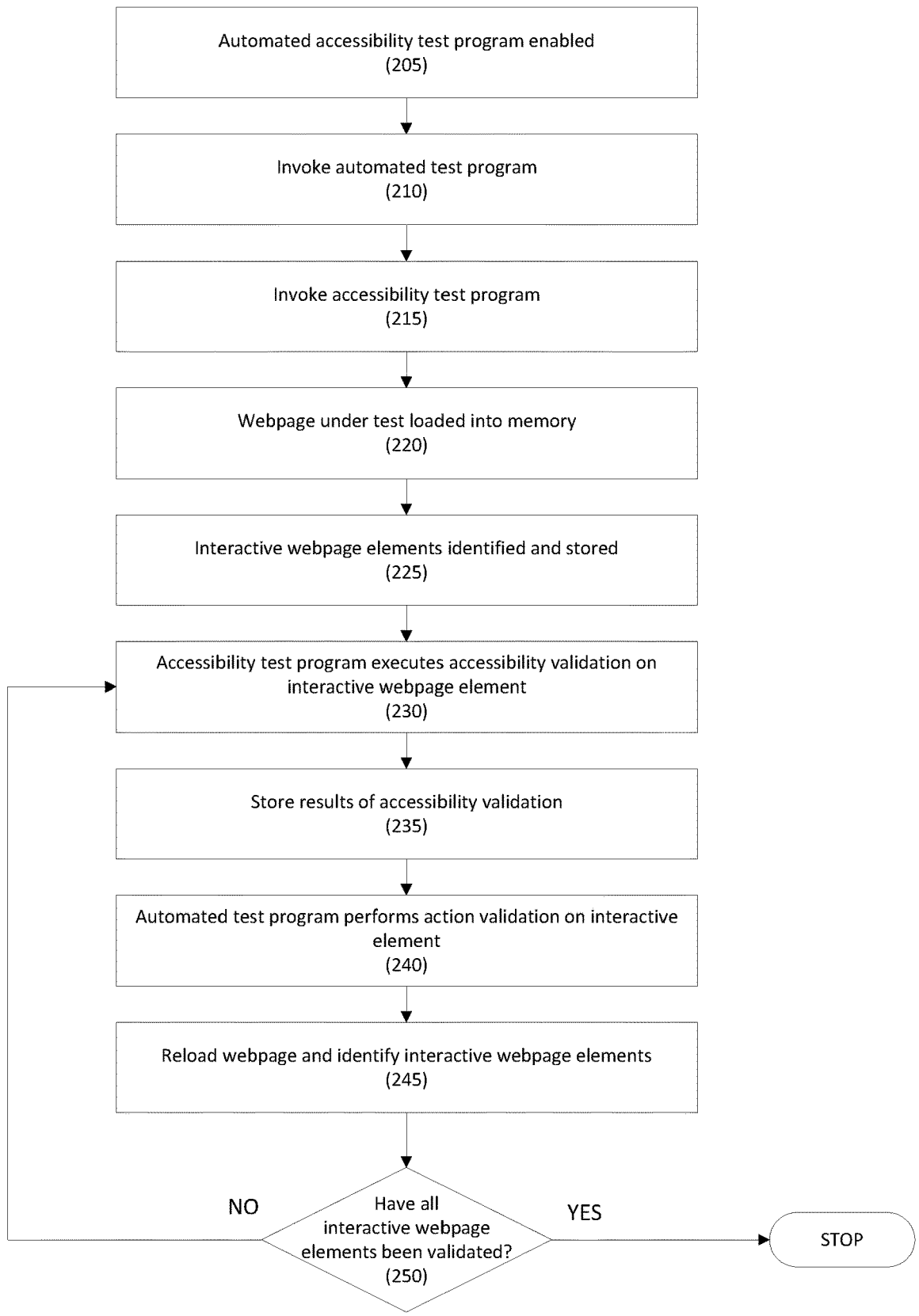
FIG. 2 depicts a method for automated invocation of accessibility validations in accessibility scripts according to one embodiment.

Referring to FIG. 2, a method for automated invocation of accessibility validations in accessibility scripts is disclosed according to one embodiment.

In step 205, an automated accessibility test program may be enabled. In one embodiment, the accessibility test program may be integrated into an automation framework. For example, the accessibility test program may be provided as a binary file.

In another embodiment, the accessibility test program may operate independently.

In step 210, an automated test program may be invoked. In one embodiment, the automated test program may include a test suite (e.g., a group of scripts) is executed to test a webpage.

In step 215, the automated accessibility test program may be invoked. In one embodiment if the automated accessibility test program is integrated into an automation test program, when a test suite (e.g., a group of scripts) is executed by the automated test program, the automated accessibility test program will be invoked.

In one embodiment, the automated accessibility test program may be invoked by the automated test program at strategic points, such as when the webpage is loaded, when an action is taken by the webpage, etc.

In step 220, a webpage may be loaded into memory of an electronic device by, for example, the automated test program. In one embodiment, the webpage may be loaded into the memory for a server, a remote server, in the cloud, etc.

In step 225, the automated accessibility program may identify interactive webpage elements on the loaded webpage. For example, the interactive webpage element may be a toggle switch, radio button, dropdown menu, checkbox, a data entry field, or any other suitable user interface.

In one embodiment, the webpage may be traversed to identify the interactive webpage elements for validation. In one embodiment, the identified interactive webpage elements may be stored.

In step 230, the interactive webpage elements may be validated by the automated accessibility program. For example, depending on the type of interactive webpage element, a different script may be executed. Thus, a radio button may have a different validation script from that used to validate a checkbox.

In one embodiment, the accessibility test validation may test the accessibility of each interactive webpage element. For example, this may test that different items may be selected from a dropdown menu, that a radio button may be selected/unselected, that text may be entered into a text box, etc.

In addition, the accessibility test may validate any code-related violations for compliance with Web Content Accessibility Guidelines (WCAG). For example, the accessibility test may validate that all alt attributes are available for an image, etc.

In step 235, the results of the accessibility validation may be stored.

In step 240, the automated test program may perform action validation on each interactive webpage element. For example, the action validation may validate that the proper action is taken when the interactive webpage element is actuated, such as the submission of a selection from a dropdown menu, submitting a form by clicking on a button, etc.

In step 245, the webpage may be re-loaded into memory, and the interactive webpage elements on the reloaded webpage may be identified. This may be similar to steps 220 and 225, above.

In step 250, a check may be made to see if all of the identified interactive webpage elements have been validated. If they have, the process is complete. If there are new or changed interactive webpage elements in the reloaded webpage, the process may continue to step 230.

The process may be repeated until no new or changed interactive webpage elements are identified.

Although several embodiments have been disclosed, it should be recognized that these embodiments are not mutually exclusive, and features from one embodiment may be used with others.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated invocation of accessibility validations in accessibility scripts, comprising:
    in an information processing apparatus comprising at least one computer processor, an automated accessibility test program performing the following:
    invoking an automated test program;
    invoking the automated accessibility test program in the automated test program wherein the automated accessibility test program comprises a binary file that is integrated into the automated test program;
    loading a webpage to be validated;
    identifying at least one interactive webpage element on the webpage;
    causing the automated accessibility test program to validate the interactive webpage element with the automated accessibility test program;
    storing a result of the validation; and
    performing an action validation on the interactive webpage element.

2. The method of claim 1, wherein the automated accessibility test program is invoked when the webpage is loaded.

3. The method of claim 1, wherein the automated accessibility test program is invoked at an action with the webpage.

4. The method of claim 1, wherein the interactive webpage element comprises at least one of a toggle switch, a radio button, a dropdown menu, a checkbox, and a data entry field.

5. The method of claim 1, further comprising:
    storing the interactive webpage elements.

6. The method of claim 1, wherein the step of causing the automated accessibility program to validate the interactive webpage element with the automated accessibility program comprises executing a script to validate the interactive webpage element.

7. The method of claim 6, wherein the script is specific to a type of interactive webpage element.

8. The method of claim 1, wherein the automated accessibility program to validates the interactive webpage element for code-related violations.

9. The method of claim 1, wherein the action validation validates that the proper action was taken in response to the actuation of the interactive webpage element.

10. The method of claim 1, further comprising:
    reloading the webpage;
    identifying a second interactive webpage element that is new or has changed;
    causing the automated accessibility program to validate the second interactive webpage element with the automated accessibility program;
    storing a result of the validation; and
    performing an action validation on the second interactive webpage element.

11. A system for automated invocation of accessibility validations in accessibility scripts, comprising:
    a hosting electronic device comprising at least a first computer processor and hosting a webpage under test; and
    a testing electronic device comprising at least a second computer processor and executing an automation framework and an accessibility test program;

wherein:
the testing electronic device invokes an automated test program;
the automation framework invokes the automated accessibility test program wherein the automated accessibility test program comprises a binary file that is integrated into the automated test program;
the automation framework loads the webpage under test;
the automation framework or the automated accessibility test program identifies at least one interactive webpage element on the webpage under test;
the automated accessibility test program validates the interactive webpage element with the automated accessibility program;
the automated accessibility test program stores a result of the validation; and
the automation framework performs action validation on the interactive webpage element.

12. The system of claim 11, wherein:
the automation framework reloads the webpage under test;
the automation framework or the automated accessibility program identifies a second interactive webpage element that is new or has changed;
the automated accessibility program validates the second interactive webpage element;
the automated accessibility program stores a result of the validation; and
the automation framework performs action validation on the second interactive webpage element.

13. The system of claim 11, wherein the automated accessibility test program comprises a binary file that is integrated into the automation framework.

14. The system of claim 11, wherein the automated accessibility test program is invoked when the webpage is loaded.

15. The system of claim 11, wherein the automated accessibility test program is invoked at an action with the webpage.

16. The system of claim 11, wherein the automated accessibility program executes a script to validate the interactive webpage element.

17. The system of claim 11, wherein the automated accessibility program to validates the interactive webpage element for code-related violations.

18. The system of claim 11, wherein the action validation validates that the proper action was taken in response to the actuation of the interactive webpage element.

19. The system of claim 11, wherein the interactive webpage element comprises at least one of a toggle switch, a radio button, a dropdown menu, a checkbox, and a data entry field.

20. The system of claim 11, wherein the automation framework or the automated accessibility program stores the interactive webpage elements.

* * * * *